(12) United States Patent
Woolard et al.

(10) Patent No.: US 10,757,943 B2
(45) Date of Patent: Sep. 1, 2020

(54) THIDIAZURON MIXTURES AND USES THEREOF

(71) Applicant: Valent BioSciences LLC, Libertyville, IL (US)

(72) Inventors: Derek D. Woolard, Zion, IL (US); Franklin Paul Silverman, Highland Park, IL (US); Zhengyu Huang, Buffalo Grove, IL (US); Robert Fritts, Clovis, CA (US); Benjamin A. Belkind, Wilmette, IL (US); Peter D. Petracek, Grayslake, IL (US)

(73) Assignee: VALENT BIOSCIENCES LLC, Libertyville, IL (US)

( * ) Notice: Subject to any disclaimer, the term of this patent is extended or adjusted under 35 U.S.C. 154(b) by 0 days.

(21) Appl. No.: 16/033,263

(22) Filed: Jul. 12, 2018

(65) Prior Publication Data
US 2019/0014784 A1 Jan. 17, 2019

Related U.S. Application Data

(60) Provisional application No. 62/532,650, filed on Jul. 14, 2017.

(51) Int. Cl.
*A01N 47/36* (2006.01)
*C05C 1/00* (2006.01)
*C05C 9/00* (2006.01)
*C05G 3/60* (2020.01)
*A01N 53/00* (2006.01)

(52) U.S. Cl.
CPC ............... *A01N 47/36* (2013.01); *C05C 1/00* (2013.01); *C05C 9/00* (2013.01); *C05G 3/60* (2020.02)

(58) Field of Classification Search
CPC .......... A01N 47/36; A01N 53/00; C05C 1/00; C05C 5/005; C05C 9/005; C05C 9/00; C05G 3/02; C05D 3/00; C07D 417/12; C07D 417/14
USPC ......................................................... 504/139
See application file for complete search history.

(56) References Cited

U.S. PATENT DOCUMENTS

| 3,619,160 A | 11/1971 | Gabrielson et al. |
| 2006/0179976 A1* | 8/2006 | Silva .................. C05C 3/00 75/324 |
| 2007/0149401 A1 | 6/2007 | Haskell et al. |
| 2008/0039322 A1 | 2/2008 | Wang et al. |
| 2016/0330963 A1* | 11/2016 | Papadopoulos ........ A01N 59/06 |

FOREIGN PATENT DOCUMENTS

| CN | 104370643 A | | 2/2015 |
| CN | 106927901 A | | 7/2015 |
| CN | 106927901 A | * | 7/2017 |

OTHER PUBLICATIONS

International Search Report and Written Opinion dated Sep. 26, 2018.

* cited by examiner

*Primary Examiner* — Michael G. Hartley
*Assistant Examiner* — Courtney A Brown
(74) *Attorney, Agent, or Firm* — Wood, Phillips, Katz, Clark & Mortimer

(57) ABSTRACT

The present invention relates to thidiazuron mixtures. The present invention further relates to methods of promoting or synchronizing bud break in woody perennial plants by applying thidiazuron mixtures of the present invention. The present invention further relates to methods of promoting plant growth in woody perennial plants by applying thidiazuron mixtures of the present invention.

19 Claims, No Drawings

THIDIAZURON MIXTURES AND USES THEREOF

FIELD OF THE INVENTION

The present invention relates to thidiazuron mixtures. The present invention further relates to methods of promoting or synchronizing bud break in woody perennial plants by applying thidiazuron mixtures of the present invention. The present invention further relates to methods of promoting plant growth in woody perennial plants by applying thidiazuron mixtures of the present invention.

BACKGROUND OF THE INVENTION

Perennial woody plants such as deciduous fruit trees and grape vines require chilling temperatures between growing seasons to properly bear a commercially acceptable fruit yield during the growing season. Specifically, the plants develop a resting bud at the conclusion of the growing season that better survives chilling temperatures between growing seasons. This bud stage is known as dormancy. In order for dormancy to be broken and plant growth to resume, a threshold amount of chilling is required. Effective chilling is based on both the duration of chilling and the temperature of the chilling period. This is normally followed by elevated temperatures that break dormancy and lead to synchronous flowering and fruit development. This breaking of dormancy in perennial woody plants is known as bud break.

In warmer climates, perennial woody plants do not receive sufficient chilling, and without chemical intervention to break dormancy, asynchronous bud break, flowering and fruit set may significantly reduce fruit yield. The most commercially successful bud dormancy breaking chemical is hydrogen cyanamide. Hydrogen cyanamide is the active agent in Dormex® (Dormex is a registered trademark of and available from AlzChem AG, Germany). In addition to compensating for a lack of chilling, hydrogen cyanamide has been used to initiate earlier bud break and more synchronous bud break leading to better fruit yields. However, hydrogen cyanamide is highly toxic and has been shown to cause adverse human health effects from contact with the skin and/or mucous membranes. See Schep et al.: The adverse effects of hydrogen cyanamide on human health: an evaluation of inquiries to the New Zealand National Poisons Centre. *Clin Toxicol (Phila)*. 2009 47(1):58-60. Moreover, high rates of hydrogen cyanamide are associated with in-season phytotoxicity and long-term decline in vine health and bearing.

Thidiazuron, 1-Phenyl-3-(1,2,3-thiadiazol-5-yl)urea, is another chemical that has been used to break bud dormancy. Thidiazuron has been reported to break dormancy in apples, plums, and grapes. See Wang S Y, et al.: Breaking bud dormancy in apple with a plant bioregulator, thidiazuron, *Phytochem*, 1986 January, 25(2), 311-317; and Alvarado R H, et al.: Thidiazuron, flower budbreak and ovary dimensions in Japanese plum (*Prunus salicina L.*) "Shiro", *Agrociencia*, 2002 34(3) 321-327. However, thidiazuron is less-effective and not as reproducible as a dormancy beaker in the field as hydrogen cyanamide. Moreover, it may be phytotoxic at high concentrations.

Nitrogen-containing fertilizers are used to enhance plant growth in most plant species. Nitrogen fertilizers have also been shown to promote bud break and bud break synchrony in apples, cherries and grapes. Hawerroth F J, et al.: Erger and calcium nitrate concentration for budbreak induction in apple trees, *Acta Hort.*, 2010 August, 872(32), 239-244. However, nitrogen fertilizers are not as effective or consistent as hydrogen cyanamide at breaking bud dormancy.

Accordingly, there is a need in the art for a composition that can break bud dormancy as well or better than hydrogen cyanamide but without causing negative plant or animal health issues.

SUMMARY OF THE INVENTION

The present invention is directed to an agricultural composition for breaking bud dormancy comprising a mixture of an effective amount of thidiazuron and an effective amount of a second active agent selected from the group consisting of 17-0-0 fertilizer, 15-0-0 fertilizer and 1-aminocyclopropane-1-carboxylic acid, wherein the amount of thidiazuron and the second active agent is at a ratio from about 1:0.3 to about 1:3,000.

The present invention is further directed to a method of promoting or synchronizing bud break and flowering in woody perennial plants comprising applying a composition comprising an effective amount of thidiazuron and an effective amount of a second active agent selected from the group consisting of 17-0-0 fertilizer, 15-0-0 fertilizer and 1-aminocyclopropane-1-carboxylic acid, wherein the amount of thidiazuron and the second active agent is at a ratio from about 1:0.3 to about 1:3,000.

The present invention is further directed to a method of promoting plant growth in woody perennial plants comprising applying a composition comprising an effective amount of thidiazuron and an effective amount of a second active agent selected from the group consisting of 17-0-0 fertilizer, 15-0-0 fertilizer and 1-aminocyclopropane-1-carboxylic acid, wherein the amount of thidiazuron and the second active agent is at a ratio from about 1:0.3 to about 1:3,000.

DETAILED DESCRIPTION OF THE INVENTION

Thidiazuron mixtures of the present invention were unexpectedly found to promote and synchronize bud break (i.e. initiation of growth) in woody perennial plants better than the commercial bud break standard, Dormex®. Further, thidiazuron mixtures of the present invention were unexpectedly found to synergistically promote and synchronize bud break (i.e. initiation of growth) and synergistically promote plant growth in woody perennial plants over either active agent alone.

As used herein the phrase "breaking bud dormancy" or "bud break" refers to the initiation of growth from the bud following a period of dormancy.

As used herein the term "promoting" refers to initiating or enhancing.

As used herein the term "15-0-0 fertilizer" refers to a fertilizer containing about 15% nitrogen.

As used herein the term "17-0-0 fertilizer" refers to a fertilizer containing about 17% nitrogen.

The present invention can be applied via foliar spray, drench, drip, painting or rolling on with a brush, wiping on and chemigation techniques.

As used herein, all numerical values relating to amounts, ratios, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

In one embodiment, the present invention is directed to an agricultural composition for breaking bud dormancy comprising a mixture of an effective amount of thidiazuron and an effective amount of a second active agent selected from the group consisting of 17-0-0 fertilizer, 15-0-0 fertilizer and 1-aminocyclopropane-l-carboxylic acid, wherein the amount of thidiazuron and the second active agent is at a ratio from about 1:0.3 to about 1:3,000.

In another embodiment, the present invention is directed to an agricultural pre-mix composition for breaking bud dormancy of woody perennial plants comprising about 0.090% w/w thidiazuron, about 90% w/w 17-0-0 fertilizer, about 0.6% w/w propyl gallate, about 8.3% w/w polyethylene glycol 200, about 0.75% w/w of a combination of alkylphenol ethoxylate, polysiloxane polyether copolymer and propylene glycol and 0.30% w/w xanthan gum.

In another embodiment, the present invention is directed to a method of promoting or synchronizing bud break and flowering in woody perennial plants, preferably grape vines, comprising applying a composition comprising an effective amount of thidiazuron and an effective amount of a second active agent selected from the group consisting of 17-0-0 fertilizer, 15-0-0 fertilizer and 1-aminocyclopropane-1-carboxylic, wherein the amount of thidiazuron and the second active agent is at a ratio from about 1:0.3 to about 1:3,000.

In another embodiment, the present invention is directed to a method of promoting plant growth in woody perennial plants, preferably grape vines, comprising applying a composition comprising an effective amount of thidiazuron and an effective amount of a second active agent selected from the group consisting of 17-0-0 fertilizer, 15-0-0 fertilizer and 1-aminocyclopropane-1-carboxylic acid, wherein the amount of thidiazuron and the second active agent is at a ratio from about 1:0.3 to about 1:3,000.

In methods of the present invention thidiazuron and the second active agent may be applied sequentially or concurrently.

In a preferred embodiment, the present invention is directed to an agricultural composition for breaking bud dormancy comprising thidiazuron and 15-0-0 fertilizer at a ratio from about 1:100 to about 1:3,000, more preferably from about 1:500 to about 1:1,500 and even more preferably at about 1:797.

In a preferred embodiment, the present invention is directed to an agricultural composition for breaking bud dormancy comprising thidiazuron and 17-0-0 fertilizer at a ratio from about 1:100 to about 1:1,000, more preferably from about 1:400 to about 1:700 and even more preferably at about 1:657.

In a preferred embodiment, the present invention is directed to an agricultural composition for breaking bud dormancy comprising thidiazuron and 1-aminocyclopropane-1-carboxylic acid at a ratio from about 1:1 to about 1:10, more preferably from about 1:2 to about 1:4 and even more preferably at about 1:3.3.

Woody perennial plants refer to plants with stems that do not die back to the ground from which they grew and include, but are not limited to, grape vines, kiwifruit vines, stone fruit trees including but not limited to peach trees, nectarine trees, apricot trees, and cherry trees, apples trees, pear trees, blueberry bushes, brambles including, but not limited to raspberry and blackberry.

These representative embodiments are in no way limiting and are described solely to illustrate some aspects of the invention.

Further, the following example is offered by way of illustration only and not by way of limitation.

EXAMPLES

Example 1

Thidiazuron Mixtures on Concord Grape Vines

An aqueous 50% hydrogen cyanamide solution (Sigma-Aldrich, St. Louis, Mo. USA) was used as the source of hydrogen cyanamide. The commercial product, Dormex® contains 50% hydrogen cyanamide (w/v) in water.

Erger® was used as the source of 15-0-0 fertilizer. (Erger is a registered trademark of Valagro S.P.A., Italy and is available from Helena Chemical Company, Collierville, Tenn., USA). Erger® contains 15% total nitrogen as 3.1% ammoniacal nitrogen, 5.8% nitrate nitrogen and 6.1% urea nitrogen and 3.3% calcium derived from ammonium nitrate, calcium nitrate and urea. As used herein, the term "15-0-0 fertilizer" refers to the Erger® formulation above and all formulations described in International PCT application publication WO/2001/037653A2 by Valagro S.P.A., Italy, which is incorporated, herein, in its entirety. In the following examples, 15-0-0 fertilizer was applied at a rate of 208,340 ppm calcium nitrate, 15,060 ppm nitrogen nitrate and 15,660 ppm urea or 239,060 ppm total.

CAN-17 was used as the source of 17-0-0 fertilizer. CAN-17 contains 17% total nitrogen as 4.6% ammonium nitrogen and 11.6% nitrate nitrogen and 1.3% urea nitrogen and 8.8% calcium derived from ammonium nitrate and calcium nitrate. CAN-17 is available from J.R. Simplot Company (Boise, Id., USA). In the following examples, 17-0-0 fertilizer was applied at a rate of 118,200 ppm calcium nitrate and 78,900 ppm nitrogen nitrate or 197,100 ppm total.

Method

To assess the ability of mixtures of the invention to promote and synchronize bud break these mixtures were applied to Concord grape vines and examined for bud break (initiation of growth) and subsequent shoot development. Specifically, 1 year old dormant bare rooted Concord grape vines were planted in pots containing Pro-Mix® BX potting soil (Pro-Mix is a registered trademark of and available from Premier Horticulture Ltd.) and pruned to 5 nodes on a single shoot. Aqueous solutions of thidiazuron, hydrogen cyanamide, 15-0-0 fertilizer, 17-0-0 fertilizer and 1-aminocyclopropane-1-carboxylic acid ("ACC"), and mixtures thereof were each applied individually or sequentially or co-applied to the first-year wood of separate Concord grape vines. Plants were grown in the greenhouse for 49 days and evaluated for percent of vines showing bud break, or relief from dormancy, periodically between 7 days and the conclusion of the experiment. Percent bud break is determined by the number of plants that have at least one bud broken divided by the total number of plants per treatment times 100. At 49 days after treatment (DAT), the plants were sacrificed and measured for total number of flower clusters, total new shoot length, longest new shoot, combined new shoot fresh weight and combined new shoot dry weight. New shoot growth is the growth arising from the dormant buds not including the woody growth that was planted and gave rise to the new growth.

Synergy is calculated by the Abbott method:

$$\%C_{exp}=A+B-(AB/100),$$

where % $C_{exp}$ is the expected efficacy and in which A and B are the speed of bud break or shoot length or shoot weight given by the single active ingredients. If the ratio between the experimentally observed efficacy of the mixture $C_{obs}$ and the expected efficacy of the mixture is greater than 1, synergistic interactions are present in the mixture" (Gisi, Synergistic Interaction of Fungicides in Mixtures, The American Phytopathological Society, 86:11, 1273-1279, 1996).

Results

TABLE 1

Percentage of Concord Grape Vines with Dormancy Relieved

| % bud break | Conc. (ppm) | 7 DAT | 10 DAT | 13 DAT | 15 DAT | 17 DAT | 20 DAT | 22 DAT | 24 DAT |
|---|---|---|---|---|---|---|---|---|---|
| Control | n/a | 0 | 0.0% | 0.0% | 0.0% | 0.0% | 11.1% | 11.1% | 22.2% |
| Hydrogen Cyanamide | 10,000 | 0 | 11.1% | 44.4% | 66.7% | 77.8% | 88.9% | 88.9% | 88.9% |
| Thidiazuron (300) | 300 | 0 | 0.0% | 0.0% | 0.0% | 11.1% | 11.1% | 22.2% | 33.3% |
| Thidiazuron (1,000) | 1,000 | 0 | 44.4% | 77.8% | 88.9% | 88.9% | 100.0% | 100.0% | 100.0% |
| 17-0-0 Fertilizer | 197,100 | 0 | 0.0% | 11.1% | 22.2% | 22.2% | 33.3% | 33.3% | 33.3% |
| 15-0-0 Fertilizer | 239,060 | 0 | 0.0% | 11.1% | 22.2% | 44.4% | 44.4% | 44.4% | 44.4% |
| ACC | 1,000 | 0 | 11.1% | 11.1% | 11.1% | 11.1% | 11.1% | 22.2% | 22.2% |
| Thidiazuron + 17-0-0 Fertilizer | 300 197,100 | 0 | 44.4% | 55.6% | 77.8% | 77.8% | 77.8% | 88.9% | 88.9% |
| Thidiazuron + 15-0-0 Fertilizer | 300 239,060 | 0 | 22.2% | 33.3% | 66.7% | 88.9% | 88.9% | 88.9% | 88.9% |
| Thidiazuron + ACC | 300 1,000 | 0 | 0.0% | 22.2% | 33.3% | 33.3% | 33.3% | 33.3% | 33.3% |
| Thidiazuron (0.09%) + 17-0-0 Fertilizer (90%) Premix | 197,100 | 0 | 11.1% | 11.1% | 22.2% | 22.2% | 22.2% | 22.2% | 33.3% |

| % bud break | 27 DAT | 29 DAT | 31 DAT | 34 DAT | 36 DAT | 38 DAT | 41 DAT | 43 DAT | 49 DAT |
|---|---|---|---|---|---|---|---|---|---|
| Control | 44.4% | 44.4% | 44.4% | 44.4% | 44.4% | 44.4% | 44.4% | 44.4% | 44.4% |
| Hydrogen Cyanamide | 88.9% | 88.9% | 88.9% | 100.0% | 100.0% | 100.0% | 100.0% | 100.0% | 100.0% |
| Thidiazuron (300 ppm) | 33.3% | 33.3% | 33.3% | 33.3% | 44.4% | 55.6% | 55.6% | 66.7% | 77.8% |
| Thidiazuron (1,000 ppm) | 100.0% | 100.0% | 100.0% | 100.0% | 100.0% | 100.0% | 100.0% | 100.0% | 100.0% |
| 17-0-0 Fertilizer | 44.4% | 55.6% | 55.6% | 77.8% | 88.9% | 88.9% | 100.0% | 100.0% | 100.0% |
| 15-0-0 Fertilizer | 44.4% | 44.4% | 44.4% | 44.4% | 44.4% | 44.4% | 66.7% | 66.7% | 88.9% |
| ACC | 22.2% | 33.3% | 33.3% | 55.6% | 66.7% | 77.8% | 77.8% | 77.8% | 77.8% |
| Thidiazuron + 17-0-0 Fertilizer | 88.9% | 88.9% | 88.9% | 88.9% | 88.9% | 88.9% | 100.0% | 100.0% | 100.0% |
| Thidiazuron + 15-0-0 Fertilizer | 100.0% | 100.0% | 100.0% | 100.0% | 100.0% | 100.0% | 100.0% | 100.0% | 100.0% |
| Thidiazuron + ACC | 33.3% | 33.3% | 44.4% | 55.6% | 66.7% | 77.8% | 77.8% | 88.9% | 88.9% |
| Thidiazuron (0.09%) + 17-0-0 Fertilizer (90%) Premix | 33.3% | 33.3% | 55.6% | 55.6% | 55.6% | 55.6% | 66.7% | 77.8% | 77.8% |

% is based on number of plants with at least one bud break
"ppm" denotes parts per million
"DAT" denotes days after treatment

TABLE 2

Concord Grape Vines Growth Measurements at 49 Day Post Treatment

| | Total Shoot Length (cm) | Longest Shoot Length (cm) | Total # of Flower Clusters | Combined Shoot Fresh Weight (g) | Combined Shoot Dry Weight (g) |
|---|---|---|---|---|---|
| Control | 27.2 | 25.4 | 0.2 | 8.1 | 1.5 |
| Hydrogen Cyanamide | 129.8 | 83.8 | 0.0 | 39.3 | 9.0 |
| Thidiazuron (300) | 28.3 | 20.1 | 0.1 | 8.2 | 1.5 |
| Thidiazuron (1000) | 88.8 | 68.3 | 0.1 | 31.8 | 6.9 |
| 17-0-0 Fertilizer | 60.1 | 56.8 | 0.4 | 19.1 | 3.7 |
| 15-0-0 Fertilizer | 53.9 | 43.4 | 0.2 | 17.6 | 3.8 |
| ACC | 28.9 | 27.9 | 0.1 | 7.1 | 1.2 |
| Thidiazuron (300) + 17-0-0 Fertilizer | 88.2 (1.2) | 79.5 (1.2) | 0.4 | 30.3 (1.2) | 6.8 (1.3) |
| Thidiazuron (300) + 15-0-0 Fertilizer | 92.3 (1.4) | 68.3 (1.2) | 0.1 | 32.7 (1.3) | 7.1 (1.3) |
| Thidiazuron (300) + ACC | 33.2 | 32.9 | 0.0 | 14.3 | 3.1 (1.2) |
| Thidiazuron (0.09%) + 17-0-0 Fertilizer (90%) Premix | 25.9 | 22.8 | 0.0 | 8.2 | 1.7 |

"cm" denotes centimeters
"g" denotes grams
(#) denotes a synergy factor greater than 1

TABLE 3

Concord Grape Vines Bud Break and Harvest Weights from Greenhouse Study

| | 25% Bud Break (DAT) | 50% Bud Break (DAT) | Initial to 50% Bud Break | 50% Bud Break to Harvest | Dry Weight (g)/ 25% Bud Break to Harvest (d) | Dry Weight (g)/ 50% Bud Break to Harvest (d) | Fresh Weight (g)/ 50% Bud Break to Harvest (d) |
|---|---|---|---|---|---|---|---|
| Control | 25 | n/a | n/a | n/a | 0.06 | n/a | n/a |
| Hydrogen Cyanamide | 11 | 14 | 5 | 35 | 0.24 | 0.26 | 1.12 |
| Thidiazuron (300) | 23 | 37 | 21 | 12 | 0.06 | 0.13 | 0.68 |
| Thidiazuron (1000) | 9 | 11 | 3 | 38 | 0.17 | 0.18 | 0.84 |
| 17-0-0 Fertilizer | 18 | 28 | 16 | 21 | 0.12 | 0.17 | 0.91 |
| 15-0-0 Fertilizer | 16 | 40 | 28 | 9 | 0.12 | 0.43 | 1.95 |
| ACC | 28 | 34 | 25 | 15 | 0.06 | 0.08 | 0.47 |
| Thidiazuron (300) + 17-0-0 Fertilizer | 9 | 12 | 4 | 37(1.2) | 0.17 | 0.18 | 0.82 |
| Thidiazuron (300) + 15-0-0 Fertilizer | 11 | 14 | 6 | 35(1.8) | 0.19(1.1) | 0.20 | 0.93 |
| Thidiazuron (300) + ACC | 14 | 33 | 22 | 16 | 0.09 | 0.19 | 0.89 |
| Thidiazuron (0.09%) + 17-0-0 Fertilizer (90%) Premix | 23 | 31 | 22 | 18 | 0.07 | 0.10 | 0.46 |

"DAT" denotes days after treatment
"g" denotes days
"Dry Weight" denotes the combined shoot dry weight at 49 DAT in grams
"Fresh Weight" denotes the combined shoot fresh weight at 49 DAT in grams
(#) denotes a synergy factor greater than 1

As seen in Table 3, application of hydrogen cyanamide, the commercial standard for bud breaking, to Concord grape vines caused the plants to reach 50% bud break by 14 days after treatment ("DAT"). The only single active capable of causing the plants to reach 50% bud break faster than hydrogen cyanamide was thidiazuron at 1,000 parts per million ("ppm"). Specifically, the application of 1,000 ppm thidiazuron caused the plants to reach 50% bud break in 11 days. However, co-application of 300 ppm thidiazuron with 17-0-0 fertilizer or 15-0-0 fertilizer caused the plants to reach 50% bud break in 14 and 12 days, respectively. This data demonstrates that mixtures of 300 ppm thidiazuron and particular nitrogen fertilizers work as well or better than the industry leading hydrogen cyanamide at causing bud break.

Also seen in Table 3, application of hydrogen cyanamide to Concord grape vines caused the plants to reach 50% bud break within 5 days after initial bud break. This measurement is a function of the synchrony of bud break. Specifically, the shorter the period between initial bud break and 50% bud break the more synchronous the bud break. Bud break synchrony is a highly desirable trait for growers. The only single active capable of causing a more synchronous bud break than hydrogen cyanamide was 1,000 ppm thidiazuron at 3 days. However, co-application of 300 ppm thidiazuron with 17-0-0 fertilizer or 15-0-0 fertilizer resulted in 4 and 5 days between initial and 50% bud break, respectively.

Further, the co-application of each of thidiazuron and 17-0-0 fertilizer or 15-0-0 fertilizer demonstrated unexpected synergistic results. First, as seen in Table 2, each of these mixtures produced synergistic total new shoot length, longest new shoot length, combined new shoot dry weight and combined new shoot fresh weight at harvest (day 49) over application of each alone. Next, as seen in Table 3, co-application of thidiazuron and 17-0-0 fertilizer resulted in 37 days from 50% bud break to harvest (day 49) as opposed to 12 and 21 days alone, respectively. This gives a synergy factor of 1.2 as calculated using the Abbott method described above. Co-application of thidiazuron and 15-0-0 fertilizer resulted in a synergy factor of 1.8. Further, the co-application of each of thidiazuron and 15-0-0 fertilizer demonstrated unexpected synergistic dry shoot weight increases at harvest when normalized by 25% bud break time in days. Specifically, as seen in Table 3, co-application of thidiazuron and 15-0-0 fertilizer resulted in a synergy factor of 1.1. Thus, application of mixtures of the present invention lead to unexpected promotion of dormancy breaking over current commercial applications. Further, application of mixtures of the present invention lead to unexpected and synergistic promotion of plant growth and bud break.

Example 2

Thidiazuron Mixtures on Red Flame Seedless Grape Vines

Method

To assess the ability of mixtures of the invention to promote and synchronize bud break these mixtures were applied to field-grown Red Flame seedless grape vines and examined for bud break (initiation of growth) and subsequent shoot development. Thidiazuron, hydrogen cyanamide, 17-0-0 fertilizer, and mixtures thereof were each applied individually or sequentially (co-applied) to the separate spurs of Red Flame seedless grape vines. Plants were evaluated for bud break at 31 days after treatment, for percent bud break and total new shoot length at 48 days after treatment. Results of these evaluations can be seen below in Tables 4 and 5.

TABLE 4

Average Buds Broken per Spur at 31 Day after Treatment

|  | Conc. (ppm) | Broken Buds per plant |
|---|---|---|
| Control | 0 | 0.2 |
| Hydrogen Cyanamide | 10,000 | 0.53 |
| Thidiazuron | 300 | 0.1 |
| Thidiazuron | 1,000 | 0.4 |
| 17-0-0 Fertilizer | 197,100 | 1.0 |
| Thidiazuron + 17-0-0 Fertilizer | 300 197,100 | 1.3 (1.18) |

"ppm" denotes parts per million
(#) denotes a synergy factor greater than 1

TABLE 5

Percent Dormancy Relieved and Total New Shoot Length at 48 Days after Treatment

|  | Conc. (ppm) | % Broken Buds | Total Shoot Length |
|---|---|---|---|
| Control | 0 | 61.7% | 14.2 |
| Hydrogen Cyanamide | 10,000 | 58.8% | 25.2 |
| Thidiazuron | 300 | 80% | 15.38 |
| Thidiazuron | 1,000 | 78.1% | 24.3 |
| 17-0-0 Fertilizer | 197,100 | 80% | 41.4 |
| Thidiazuron + 17-0-0 Fertilizer | 300 197,100 | 67.1% | 42.98 |

"ppm" denotes parts per million

As shown above in Table 4, the co-application of thidiazuron and 17-0-0 fertilizer resulted in a synergistic average number of broken buds 31 days after treatment. Additionally, as shown in Table 5, this co-application resulted in greater total shoot length at 48 days after treatment. However, as shown in Table 5, percent bud break at 48 days did not result in a comparable outcome. Hydrogen cyanamide, 1,000 ppm thidiazuron and the combination of 300 ppm thidiazuron and 197,100 ppm 17-0-0 fertilizer resulted in inferior bud break compared to 300 ppm thidiazuron and 197,100 ppm 17-0-0 fertilizer, alone. This result may be due to the timing of evaluation.

Example 3

Thidiazuron Combination Premix Stability

A pre-mix formulation of thidiazuron and 17-0-0 fertilizer was developed. The ratio between thidiazuron and 17-0-0 fertilizer is 1:1000 and the components for the formulation are listed in the Table 6 below. The physical property and the active ingredient thidiazuron in this formulation were stable in accelerated stability test at 54° C. for 2 weeks. Pentra-Bark® (Pentra-Bark is a registered trademark of Quest Products Corporation) surfactant was used as the source of combination of alkylphenol ethoxylate, polysiloxane polyether copolymer, propylene glycol.

TABLE 6

Thidiazuron Combination Premix Formulation

| Ingredient | Concentration |
| --- | --- |
| Thidiazuron (97.2%) | 0.090% |
| 17-0-0 Fertilizer | 90.00% |
| Propyl gallate | 0.600% |
| Polyethylene Glycol 200 | 8.255% |
| Combination of Alkylphenol ethoxylate, Polysiloxane Polyether copolymer, Propylene glycol | 0.750% |
| Xanthan gum | 0.300% | treatment solutions were applied to the plants. Where a single component was used for a treatment, the first application solution was water containing surfactant; in the cases where combination treatments were made to the same plant, the first treatment solution was allowed to dry prior to applying the second.

The treated plants were kept in a conventional greenhouse under supplemental lighting. Greenhouse conditions were 65:60° F. Day:Night temperature with a 16:8 hour photoperiod. Relief from dormancy was assessed every two days during the course of the study. Dormancy was considered relieved upon the emergence of a green bud. Both the number of 'broken buds' per plant and the date of relief of plants from dormancy were assessed. At the close of the study, new growth was removed from each of the treated plants and weighed.

TABLE 7

Concord Grape Vines Bud Break and Harvest Weights from Greenhouse Study

|  | 50% Bud Break (DAT) | 100% Bud Break (DAT) | Initial to 50% Bud Break | Number of Buds Broken/Plant | Fresh Shoot Weight (g)/Plant |
| --- | --- | --- | --- | --- | --- |
| Control | 28 | 42 | 5 | 1.25 | 16.81 |
| Hydrogen Cyanamide | 16 | 33 | 2 | 1.5 | 31.49 |
| Thidiazuron (100) | 33 | 44 | 7 | 2 | 15.53 |
| Thidiazuron (300) | 28 | 48 | 14 | 2.125 | 13.15 |
| Thidiazuron (1000) | 21 | 37 | 7 | 4.5 | 22.45 |
| 17-0-0 Fertilizer (3%) | 30 | 44 | 11 | 1.75 | 18.64 |
| 17-0-0 Fertilizer (10%) | 21 | 55 | 2 | 1.5 | 16.99 |
| 17-0-0 Fertilizer (30%) | 23 | 42 | 9 | 1.375 | 26.90 |
| 15-0-0 Fertilizer | 30 | 48 | 11 | 1.375 | 13.79 |
| Thidiazuron (100) + 17-0-0 Fertilizer (10%) | 19 (1.29) | 42 | 11 | 1.375 | 22.81 (34.25) |
| Thidiazuron (100) + 17-0-0 Fertilizer (30%) | 19 (1.80) | 30 (14,285) | 11 | 2.25 (1.25) | 24.65 |
| Thidiazuron (300) + 17-0-0 Fertilizer (3%) | 30 | 55 | 9 | 2.5 (2.50) | 12.53 |
| Thidiazuron (300) + 17-0-0 Fertilizer (10%) | 16 (1.71) | 42 | 8 | 3.625 (2.50) | 19.83 (17.20) |
| Thidiazuron (300) + 17-0-0 Fertilizer (30%) | 14 (2.80) | 28 (16,666) | 8 | 4.5 (3.56) | 37.10 (2.01) |
| Thidiazuron (1000) + 17-0-0 Fertilizer (3%) | 21 | 28 (2.80) | 7 | 4.5 (1.33) | 21.95 |
| Thidiazuron (1000) + 17-0-0 Fertilizer (10%) | 14 (1.14) | 28 (2.80) | 8 | 4.625 (1.18) | 32.18 (2.67) |
| Thidiazuron (300) + 15-0-0 Fertilizer | 21 (12,500) | 42 | 7 | 3.5 (9.47) | 26.14 |

Example 4

Thidiazuron Mixtures on Concord Grape Vines

Two-year-old Concord grape vines were purchased commercially. These vines had just lost their leaves and were shipped shortly after they were dug at the nursery. Thus, the vines had not fulfilled their chilling requirement and were considered endo-dormant. The vines were potted individually into one-gallon pots containing ProMix® BX immediately upon receipt and subsequently pruned back to the five proximal buds on the one-year old wood. Within two hours of pruning, treatment solutions were applied using a foam paint brush to the remaining one-year old wood, including the cut end from pruning. Two treatments, water and hydrogen cyanamide, which acted as negative and positive controls, respectively, were included in all studies.

Treatment solutions were made fresh in water and contained 1% (v/v) non-ionic surfactant. In all cases, two As shown above in Table 4, the co-application of thidiazuron and 17-0-0 fertilizer or 15-0-0 fertilizer resulted in a synergistic effect on bud break including days to 50% bud break, days to 100% bud break and number of buds broken per plant. Further, this co-application resulted in synergistic increase in fresh shoot weight per plant. Synergy was seen at 3 different concentrations of thidiazuron including 100, 300 and 1,000 ppm and 3 different concentrations of 17-0-0 fertilizer including 30% (77,400 ppm; 51,000 ppm nitrogen as 16,200 ppm ammonium nitrogen and 34,800 nitrate nitrogen and 26,400 ppm calcium,), 10% (25,800 ppm; 17,000 ppm nitrogen as 5,400 ppm ammonium nitrogen and 11,600 ppm nitrate nitrogen and 8,800 ppm calcium) and 3% (7,740 ppm; 5,100 ppm nitrogen as 1,620 ppm ammonium nitrogen and 3,480 ppm nitrate nitrogen) and 2,640 ppm calcium. 15-0-0 fertilizer was applied at 65,880 ppm; 33,200 ppm nitrogen and 32,680 ppm calcium.

What is claimed is:

1. An agricultural composition for breaking bud dormancy of woody perennial plants consisting of a mixture of an effective amount of thidiazuron and an effective amount of a second active agent selected from the group consisting of 17-0-0 fertilizer, 15-0-0 fertilizer and 1-aminocyclopropane-1-carboxylic acid, wherein the amount of thidiazuron and the second active agent is at a ratio from about 1:0.3 to about 1:3,000.

2. The composition of claim 1, wherein the second active agent is 15-0-0 fertilizer and the amount of thidiazuron and 15-0-0 fertilizer is at a ratio from about 1:100 to about 1:3,000.

3. The composition of claim 1, wherein the second active agent is 15-0-0 fertilizer and the amount of thidiazuron and 15-0-0 fertilizer is at a ratio from about 1:500 to about 1:1,500.

4. The composition of claim 1, wherein the second active agent is 17-0-0 fertilizer and the amount of thidiazuron and 17-0-0 fertilizer is at a ratio from about 1:7.74 to about 1:774.

5. The composition of claim 1, wherein the second active agent is 17-0-0 fertilizer and the amount of thidiazuron and 17-0-0 fertilizer is at a ratio from about 1:400 to about 1:700.

6. The composition of claim 1, wherein the second active agent is 1-aminocyclopropane-1-carboxylic acid and the amount of thidiazuron and 1-aminocyclopropane-l-carboxylic acid is at a ratio from about 1:1 to about 1:10.

7. The composition of claim 1, wherein the second active agent is 1-aminocyclopropane-1-carboxylic acid and the amount of thidiazuron and 1-aminocyclopropane-l-carboxylic acid is at a ratio from about 1:2 to about 1:4.

8. A method of promoting plant growth in woody perennial plants comprising applying a composition of claim 1.

9. The method of claim 8, wherein the plant growth is plant shoot growth.

10. The method of claim 8, wherein the woody perennial plant is a grape vine.

11. A method of promoting bud break in woody perennial plants comprising applying a composition of claim 1.

12. The method of claim 11, wherein the woody perennial plant is a grape vine.

13. A method of synchronizing bud break in woody perennial plants comprising applying a composition of claim 1.

14. The method of claim 13, wherein the woody perennial plant is a grape vine.

15. A method of promoting or synchronizing bud break in woody perennial plants comprising applying a composition consisting of an effective amount of thidiazuron and an effective amount of a second active agent selected from the group consisting of 17-0-0 fertilizer, 15-0-0 fertilizer and 1-aminocyclopropane-l-carboxylic acid, wherein the amount of thidiazuron and the second active agent is at a ratio from about 1:0.3 to about 1:3,000.

16. The method of claim 15, wherein thidiazuron and the second active agent are applied sequentially or concurrently.

17. A method of promoting plant growth in woody perennial plants comprising applying a composition consisting of an effective amount of thidiazuron and an effective amount of a second active agent selected from the group consisting of 17-0-0 fertilizer, 15-0-0 fertilizer and 1-aminocyclopropane-1-carboxylic acid, wherein the amount of thidiazuron and the second active agent is at a ratio from about 1:0.3 to about 1:3,000.

18. The method of claim 17, wherein thidiazuron and the second active agent are applied sequentially or concurrently.

19. An agricultural pre-mix composition for breaking bud dormancy of woody perennial plants comprising about 0.090% w/w thidiazuron, about 90% w/w 17-0-0 fertilizer, about 0.6% w/w propyl gallate, about 8.3% w/w polyethylene glycol 200, about 0.75% w/w of a combination of alkylphenol ethoxylate, polysiloxane polyether copolymer and propylene glycol and 0.30% w/w xanthan gum, wherein w/w denotes weight by total weight of the composition.

* * * * *